(12) United States Patent
Miao et al.

(10) Patent No.: US 9,125,221 B2
(45) Date of Patent: Sep. 1, 2015

(54) METHOD AND APPARATUS FOR ALLOCATING RADIO RESOURCES IN CELLULAR COMMUNICATIONS NETWORK

(75) Inventors: Deshan Miao, Beijing (CN); Peter Skov, Beijing (CN); Xiaoyi Wang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 111 days.

(21) Appl. No.: 13/979,394

(22) PCT Filed: Jan. 12, 2011

(86) PCT No.: PCT/CN2011/000049
§ 371 (c)(1),
(2), (4) Date: Jul. 12, 2013

(87) PCT Pub. No.: WO2012/094777
PCT Pub. Date: Jul. 19, 2012

(65) Prior Publication Data
US 2013/0288697 A1    Oct. 31, 2013

(51) Int. Cl.
| | |
|---|---|
| *H04W 72/08* | (2009.01) |
| *H04L 5/00* | (2006.01) |
| *H04W 72/12* | (2009.01) |
| *H04L 1/18* | (2006.01) |

(52) U.S. Cl.
CPC ........... *H04W 72/085* (2013.01); *H04L 5/0007* (2013.01); *H04L 5/0037* (2013.01); *H04L 5/0055* (2013.01); *H04W 72/1263* (2013.01); *H04L 1/1861* (2013.01); *H04W 72/1278* (2013.01)

(58) Field of Classification Search
CPC .......... H04W 72/042; H04W 72/0413; H04W 72/0406; H04W 72/04; H04W 52/0212
USPC ........................ 455/452.1, 446; 370/280, 328
See application file for complete search history.

(56) References Cited

U.S. PATENT DOCUMENTS

| | | | |
|---|---|---|---|
| 7,417,966 B2 * | 8/2008 | Kalden et al. .................. 370/329 |
| 7,899,451 B2 * | 3/2011 | Hu et al. ...................... 455/422.1 |
| 7,974,177 B2 * | 7/2011 | Ofuji et al. ..................... 370/203 |
| 8,477,644 B2 * | 7/2013 | Sugawara et al. ............. 370/252 |
| 2009/0080401 A1 | 3/2009 | Zhu et al. ....................... 370/343 |
| 2009/0103500 A1 * | 4/2009 | Malkamaki et al. .......... 370/336 |
| 2009/0129330 A1 * | 5/2009 | Kim et al. ...................... 370/329 |
| 2009/0168714 A1 * | 7/2009 | Tanaka et al. ................. 370/329 |
| 2009/0268693 A1 * | 10/2009 | Lindh et al. ................... 370/336 |
| 2010/0002630 A1 * | 1/2010 | Park et al. ...................... 370/328 |
| 2010/0093360 A1 * | 4/2010 | Choi et al. ..................... 455/450 |

(Continued)

FOREIGN PATENT DOCUMENTS

| | | | |
|---|---|---|---|
| EP | 1 598 973 A1 | 11/2005 |
| WO | WO 2007/149944 A1 | 12/2007 |

*Primary Examiner* — Kashif Siddiqui
*Assistant Examiner* — Minjung Kim
(74) *Attorney, Agent, or Firm* — Harrington & Smith

(57) ABSTRACT

The invention relates to a method and apparatuses for allocating radio resources in a cellular communications network including the steps of: dynamically allocating a set of radio resources for a transmission taking place at a transmission time instance and for a further transmission taking place at a further transmission time instance, the further transmission relating to a response to the transmission taking place at the transmission time instance, and broadcasting both sets of allocated radio resources in the cellular communications network.

16 Claims, 5 Drawing Sheets

(56) References Cited

U.S. PATENT DOCUMENTS

| | | | |
|---|---|---|---|
| 2010/0124194 A1* | 5/2010 | Chun et al. | 370/329 |
| 2010/0172313 A1* | 7/2010 | Ho et al. | 370/329 |
| 2010/0246499 A1* | 9/2010 | Kim et al. | 370/329 |
| 2011/0117947 A1* | 5/2011 | Ishii et al. | 455/509 |
| 2011/0128931 A1* | 6/2011 | Ishii et al. | 370/329 |
| 2011/0305134 A1* | 12/2011 | Chung et al. | 370/216 |
| 2011/0310986 A1* | 12/2011 | Heo et al. | 375/259 |
| 2012/0026963 A1* | 2/2012 | Kim et al. | 370/329 |
| 2012/0327783 A1* | 12/2012 | Moon et al. | 370/241 |

* cited by examiner

FIG 5
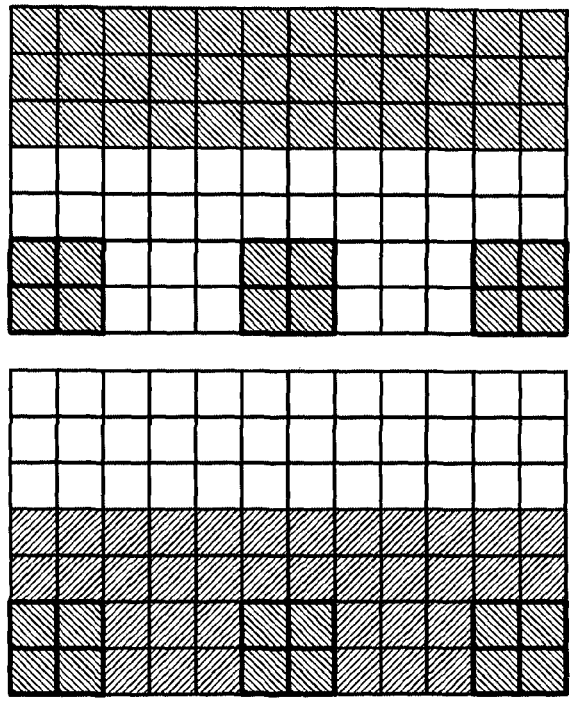
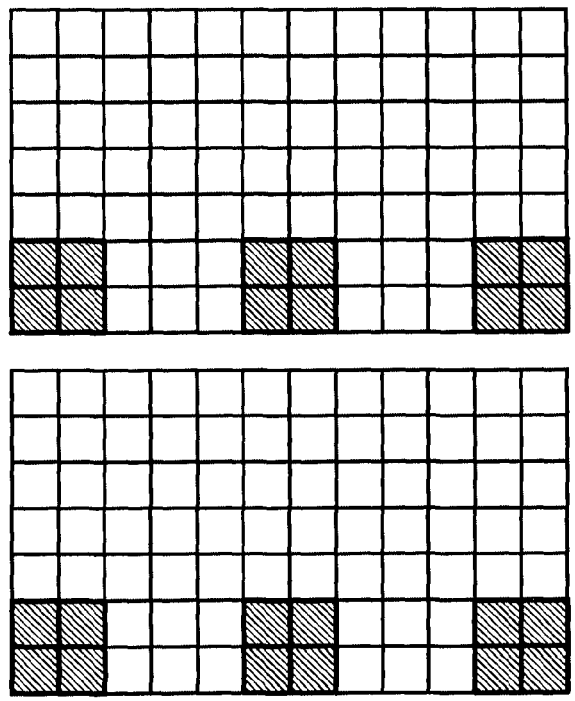

METHOD AND APPARATUS FOR ALLOCATING RADIO RESOURCES IN CELLULAR COMMUNICATIONS NETWORK

FIELD OF THE INVENTION

The present invention relates to the technical field of cellular communication networks. In particular, the present invention relates to a method allocating radio resources in such cellular communication networks. Further, the present invention relates to apparatuses which are arranged to carry out the mentioned method.

SUMMARY OF THE INVENTION

Cellular communication networks are based on the cell concept. Such networks comprise of a plurality of cells, each cell having an access node (AN), that is part of the radio access network (RAN) that allows a user equipment (UE) to access a core network (CN) such as the internet and/or the Public Switched Telephone Network (PSTN) and receive requested services. In such networks, a UE can move through the network and its mobility is supported by cell selection or handover procedures. From a radio signal point of view, isolation, in order to reduce interference caused by radio signals, is provided between cells through distance or directional antennas.

In 3G (3$^{rd}$ Generation) networks, a Radio Network Controller (RNC) combines the management functionality for a multiple number of cells. In Long Term evolution (LTE) systems, the RAN becomes more flat without an RNC entity. In such systems ANs, commonly known as an eNodeB (eNB), are independent from each other. In such structures, inter-cell interference becomes an issue. Future networks are aimed at concentrating on local area deployments. In such deployments the cell density, as well as traffic density, will be high and a moving UE will be required to carry out a lot of cell changes (i.e. handovers), related cell searches and measurements. As all these procedures are handled with Radio Resource Control (RRC) signaling, a large amount of signaling is required to maintain a connection, thus reducing the amount of available radio resources that can be used to provide services to UEs. In addition, the high number of cells can cause a large amount of inter-cell interference as well as requiring a large amount of processing resources in order to manage frequency reuse.

The above will therefore have an affect on the performance of the network and degrade the quality of service (QoS) that is provided to UEs.

A need therefore exists to render such networks more efficient, increase the amount of available radio resources and reduce inter-cell interference. This need may be met by the subject matter according to the independent claims. Advantageous embodiments of the present invention are described by the dependent claims.

According to the independent method claim, radio resources are allocated in a cellular communications network, wherein a set of radio resources are dynamically allocated for a transmission taking place at a transmission time instance and for a further transmission taking place at a further transmission time instance, the further transmission relating to a response to the transmission taking place at the transmission time instance, and broadcasting both sets of allocated radio resources in the cellular communications network.

According to the independent access node claim, the access node has means that are arranged for allocating radio resources in a cellular communications network and comprises allocating means that are arranged to dynamically allocated a set of radio resources for a transmission taking place at a transmission time instance and for a further transmission taking place at a further transmission time instance, the further transmission relating to a response to the transmission taking place at the transmission time instance, and transceiver means that are arranged to broadcast both sets of allocated radio resources in the cellular communications network.

According to the independent user equipment claim, the user equipment comprises receiving means arranged to receive a broadcast comprising a set of allocated radio resources for a transmission taking place at a transmission time instance (N) and for a further transmission taking place at a further transmission time instance (N+k), the further transmission relating to a response to the transmission taking place at the transmission time instance (N), and transmitting means arranged to transmit the further data transmission at the further transmission time instance (N+k). Furthermore, the user equipment further comprises multiplexing means arranged to multiplex data to be transmitted together with data relating to the feedback message at the further transmission time instance (N+k).

In further refinements of the invention, the response to the transmission comprises a feedback message. This feedback message can be an ACK or a NACK message. Both sets of allocated radio resources are comprised within a broadcasted downlink configuration indicator. In this way, a UE present in the network will be able to recognise which resources have been allocated to it and when to expect to receive a transmission and when to transmit a response to the received transmission. When the transmission is transmitted on a Physical Download Shared Channel, the further transmission is transmitted on a Physical Uplink Shared Channel or a Physical Uplink Control Channel. When the transmission is transmitted on a Physical Uplink Shared Channel, the further transmission is transmitted on a Physical Downlink Shared Channel or on a Physical Hybrid ARQ Indicator Channel. If there is any data present at the further transmission time instance when the response is to be transmitted, the data is multiplexed together with data relating to the response. The cellular communications network in which the invention is implemented is a centralised radio access network.

BRIEF DESCRIPTION OF THE DRAWINGS

The present invention may be understood more readily, and various other aspects and features of the invention may become apparent from consideration of the following description and accompanying figures which are given by way of illustration only, and thus are not limitative of the present invention, and wherein:

FIG. 5 shows a mapping of PHICH transmission mode and of a PDSCH transmission mode.

DETAILED DESCRIPTION

Figure 1:
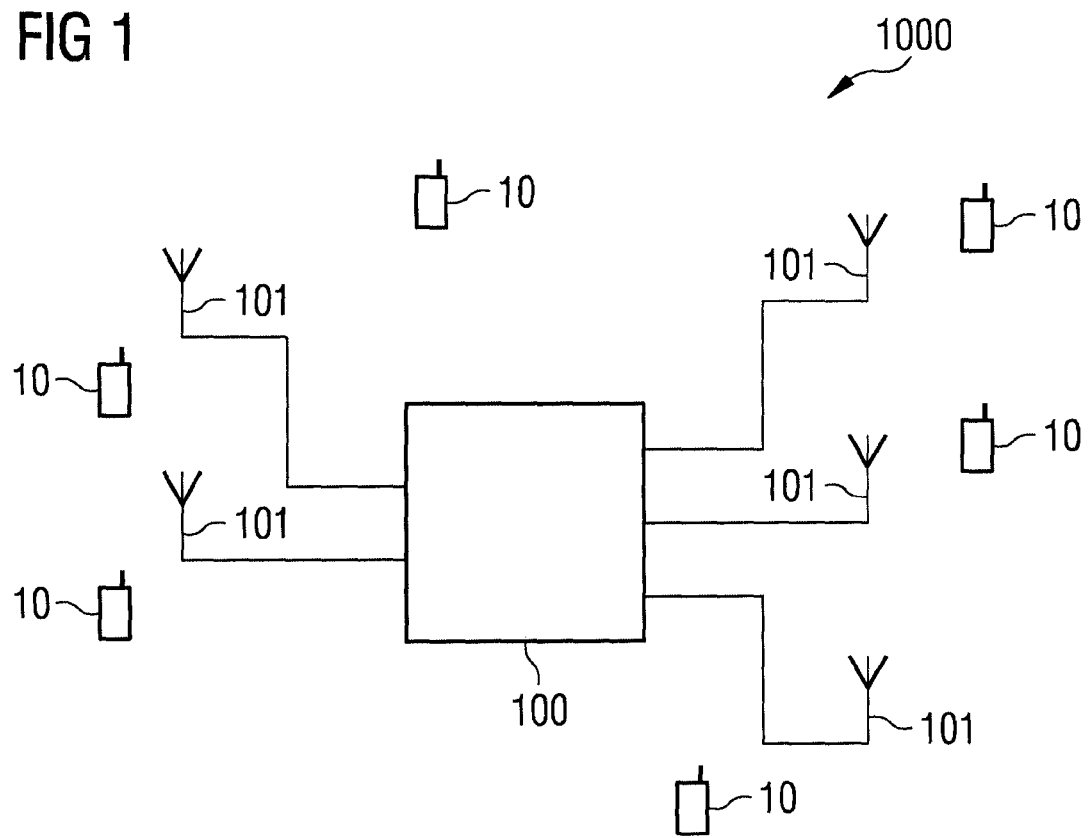
FIG. 1 shows a cellular communications network wherein the invention is implemented.

FIG. 1 shows a cellular communications network 1000 wherein the invention is implemented. In particular network 1000 is a centralised-radio access network (C-RAN), wherein signals from a plurality of antennas are centrally processed. Network 1000 comprises a plurality of ANs 100 and a plurality of UEs 10. For reasons of clarity only one AN 100 is depicted, however a person skilled in the art would be aware that a cellular communications network 1000 comprises of a plurality of ANs 100. AN 100 comprises of a plurality of distributed antennas 101 and allow UEs 10 to access and receive requested services. UEs 10 may be any type of communication end device, which is capable of connecting with an AN 100 over a wireless connection. The UE 10 may be in particular a cellular mobile phone, a Personal Digital Assistant (PDA), a notebook computer, a printer and/or any other movable communication device.

Figure 2:
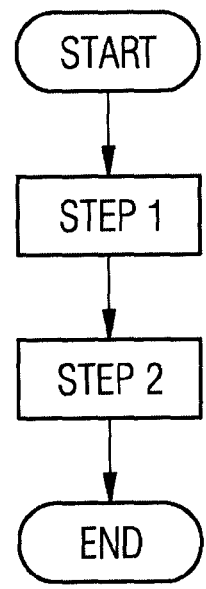
FIG. 2 shows a schematic flow diagram depicting the sequence of steps performed by the invention.

In FIG. 2 the schematic flow diagram the sequence of steps performed by the invention is depicted.

In step 1, the AN 100, dynamically allocates a set of radio resources for a transmission taking place at a transmission time instance (N) and for a further transmission taking place at a further transmission time instance (N+k). The further transmission relating to a response to the transmission taking place at the transmission time instance (N). The response comprises a feedback message which is an acknowledgment (ACK) message or a negative acknowledge character (NACK) message. The allocated set of radio resources comprise radio resource blocks (RRBs), wherein RRBs are groups of transport carriers or intervals that are assigned to transport data over a wireless connection. In step 2, the AN 100, broadcasts both sets of allocated radio resources in the cellular communications network 1000. Both sets of the allocated radio resources are comprised within a broadcasted downlink configuration indicator (DCI).

Figure 3:
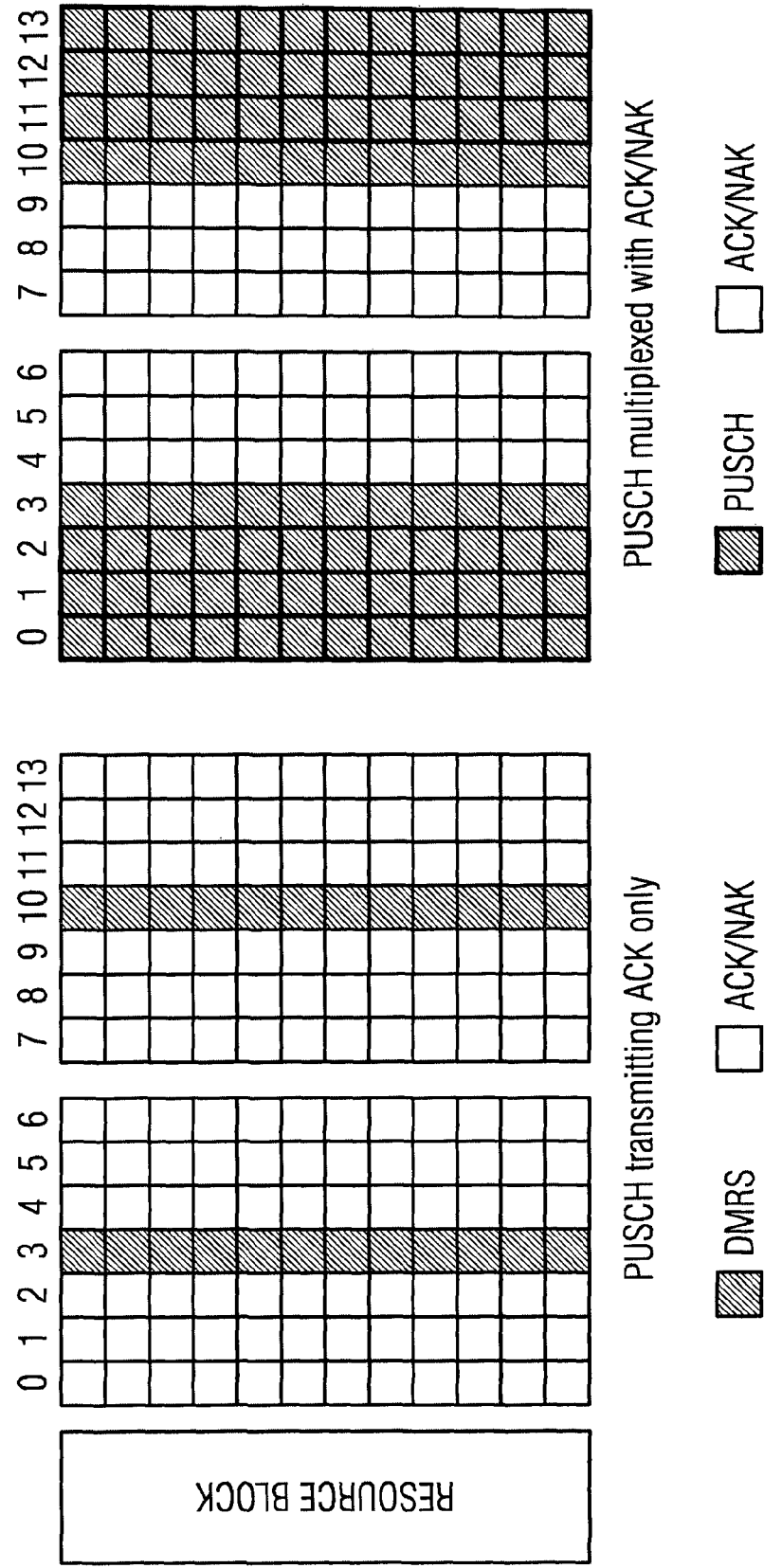
FIG. 3 shows a mapping of PUSCH transmitting ACKs only and of PUSCH multiplexes with ACKs/NAKs.

Furthermore, if the transmission (taking place at a transmission time instance (N)) is transmitted on a Physical Download Shared Channel (PDSCH), the further transmission (taking place at a transmission time instance (N+k)) is transmitted on a Physical Uplink Shared Channel (PUSCH) or a Physical Uplink Control Channel (PUCCH). As it can be seen one PUSCH resource block can carry one ACK/NACK message. In case, however, of multiple ACK/NAK transmissions, all ACK/NAK can be transmitted on one PUSCH resource block. In addition, multiple UEs can be assigned to the same PUSCH resource, as in the case when Multi-User Multiple Input Multiple Output (MU-MIMO) is performed, based on Demodulation Reference Signal (DMRS) sequence orthogonality. Two example transmission modes are illustrated in FIG. 3.

Figure 4:
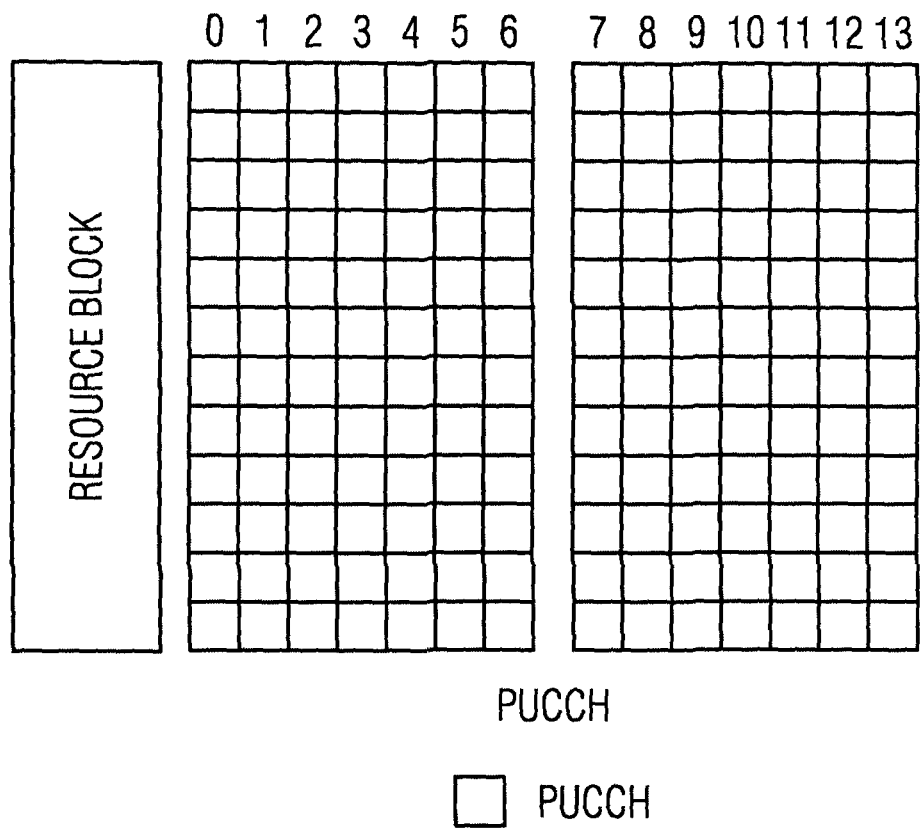
FIG. 4 shows a PUCCH mapping.

Alternatively, in order to expand the user number of uplink ACK/NAK transmissions, a PUCCH transmission can be used. In case of an independent ACK/NAK signal transmission, instead of granting PUSCH resources, a PUCCH resource is granted for multiple UEs 10 to share, for ACK/NAK signalling. The difference between PUCCH and PUSCH is that PUCCH is designed for non-coherence detection, without requiring DMRS. As a result, the PUCCH can accommodate larger number of UEs 10 at the same time in one resource block. A PUCCH mapping is shown in the FIG. 4.

Furthermore, if the transmission (taking place at a transmission time instance (N)) is transmitted on a Physical Uplink Shared Channel (PUSCH), the further transmission (taking place at a transmission time instance (N+k)) is transmitted on a Physical Downlink Shared Channel (PDSCH) or on a Physical Hybrid ARQ (Automatic Repeat Request) Indicator Channel (PHICH). Information relating to the Physical Hybrid ARQ Indicator can be multiplexed with the PDSCH.

In addition, the downlink information relating to the Physical Hybrid ARQ Indicator can be transmitted accompanied with a downlink DMRS. The downlink information can then be demodulated based on the downlink DMRS. In the event that there is no downlink data, a PHICH can be granted. As PHICH is transmitted based on DMRS, and the DMRS identity (ID) is unique for a group of users, this will facilitate UE demodulation. The ACK/NAK bits, from multiple UEs 10, are jointly encoded with a common-RNTI (Radio Network Temporary Identifier) which is known to all UEs. These two modes are illustrated in the FIG. 5.

Furthermore, if there is any data present at the further transmission time instance (N+k), it is multiplexed together with data relating to the response to be transmitted at the further transmission time instance (N+k). In this way, as data to be transmitted can be multiplexed with ACKs or NACKs messages together thus avoiding wastage of radio resources and improves network capacity.

Figure 6:
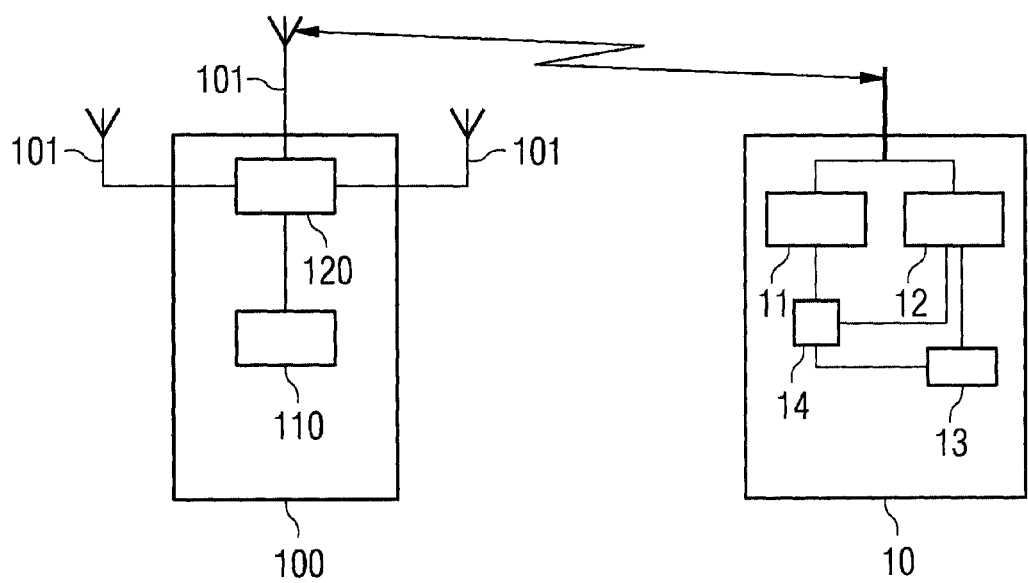
FIG. 6 shows a schematic representation of an access node and of a user equipment wherein the invention is implemented.

FIG. 6 depicts a schematic representation (block diagram) of an AN 100 comprising of a plurality of distributed antennas 101. It is noted that the block structure shown, could be implemented by a person skilled in the art in various ways, e.g., by providing various physical units which can be implemented in both hardware by using microprocessors and/or software. AN 100 can be at least one of the following: a base station, a eNodeB (eNB). AN 100 has means that are arranged to allocate radio resources in a cellular communications network 1000 which in an embodiment of the invention is a centralised radio access network. AN 100 comprises allocating means 110 arranged to dynamically allocated a set of radio resources for a transmission taking place at a transmission time instance (N) and for a further transmission taking place at a further transmission time instance (N+k), the further transmission relating to a response to the transmission taking place at the transmission time instance (N), and transceiver means 120 arranged to broadcast both sets of allocated radio resources in the cellular communications network 1000. Transceiver means 120 are also arranged to transmit and receive additional data in network 1000. The transceiver means 120 are further arranged to broadcast both sets of allocated radio resources within a downlink configuration indicator. The allocating means 110 are further arranged to allocate resources for downlink and uplink transmissions.

If resources are allocated for a transmission on a Physical Download Shared Channel, the allocating means 110 are further arranged to allocate resources for the further transmission to be transmitted on a Physical Uplink Shared Channel or a Physical Uplink Control Channel. If resources are allocated for a transmission on a Physical Uplink Shared Channel, the allocating means 110 are further arranged to allocate resources for the further transmission to be transmitted on a Physical Downlink Shared Channel or on a Physical Hybrid ARQ Indicator Channel.

UE 10 comprises receiving means 11 arranged to receive a broadcast comprising a set of allocated radio resources for a transmission taking place at a transmission time instance (N) and for a further transmission taking place at a further transmission time instance (N+k), the further transmission relating to a response to the transmission taking place at the transmission time instance (N), and transmitting means 12 arranged to transmit the further data transmission at the further transmission time instance (N+k). The receiving means 11 are further arranged to receive the set of allocated radio resources in a downlink configuration indicator. The transmitting means 12 are further arranged, when transmitting the response, for the response to comprise a feedback message. The feedback message can be an ACK or a NACK message. UE 10 has also multiplexing means 13 arranged to multiplex data to be transmitted together with data relating to the feedback message at the further transmission time instance (N+k). UE 10 further comprises of controlling means 14 that are arranged to control UE 10 and the numerous means that it comprises.

According to a further aspect of the invention, a computer program (for instance a software routine, in source code or in executable code) is provided, which, when being executed by a processor, is adapted to control or carry out a method having the above mentioned features. The computer program may be implemented as computer readable instruction code in any suitable programming language, such as, for example, JAVA, C++. The instruction code is operable to program a computer or any other programmable device to carry out the intended functions. According to another aspect of the invention, a computer-readable medium (for instance a CD, a DVD, a USB stick, a floppy disk or a hard disk) is provided, in which a computer program is stored which, when being executed by a processor, is adapted to control or carry out a method having the above mentioned features.

It has to be noted that embodiments of the invention have been described with reference to different subject matters. In particular, some embodiments have been described with reference to method type claims whereas other embodiments have been described with reference to apparatus type claims.

However, a person skilled in the art will gather from the above, unless otherwise notified, in addition to any combination of features belonging to one type of subject matter also any combination between features relating to different subject matters, in particular between features of the method type claims and features of the apparatus type claims is considered as to be disclosed with this application.

A person skilled in the art will appreciate other embodiments and modifications which can be made without departing from the scope of the teachings of the invention. All such modifications are intended to be included within the scope of the claims appended hereto.

The invention claimed is:

1. A method for allocating radio resources in a cellular communications network comprising:
   dynamically allocating a set of radio resources for a transmission taking place at a transmission time instance (N) and for a further transmission taking place at a further transmission time instance (N+k), the further transmission relating to a response to the transmission taking place at the transmission time instance (N), wherein the response comprises a feedback message, wherein the feedback message is an ACK or a NACK message, and wherein any data present at the further transmission time instance (N+k) is multiplexed together with data relating to the response to be transmitted at the further transmission time instance (N+k); and
   broadcasting both sets of allocated radio resources in the cellular communications network.

2. The method of claim 1, wherein the feedback message further comprises of one or more ACK or NACK messages.

3. The method of claim 1, wherein both sets of allocated radio resources are comprised within a broadcasted downlink configuration indicator.

4. The method of claim 1, wherein if the transmission is transmitted on a Physical Download Shared Channel, the further transmission is transmitted on a Physical Uplink Shared Channel or a Physical Uplink Control Channel.

5. The method of claim 1, wherein if the transmission is transmitted on a Physical Uplink Shared Channel, the further transmission is transmitted on a Physical Downlink Shared Channel or on a Physical Hybrid ARQ Indicator Channel.

6. The method of claim 1, wherein the multiplexed data further comprises downlink physical hybrid ARQ indicator information multiplexed on the Physical Downlink Shared Channel.

7. The method of claim 6, wherein the downlink physical hybrid ARQ indicator information is transmitted with a downlink demodulation reference signal.

8. The method of claim 7, wherein the downlink physical hybrid ARQ indicator information is demodulated based on the transmitted downlink demodulation reference signal.

9. The method of claim 1, wherein the cellular communications network is a centralised radio access network.

10. An access node in a cellular communications network comprising:
    a microprocessor programmed to dynamically allocated a set of radio resources for a transmission taking place at a transmission time instance (N) and for a further transmission taking place at a further transmission time instance (N+k), the further transmission relating to a response to the transmission taking place at the transmission time instance (N), wherein the response comprises a feedback message, wherein the feedback message is an ACK or a NACK message, and wherein any data present at the further transmission time instance (N+k) is multiplexed together with data relating to the response to be transmitted at the further transmission time instance (N+k); and
    a transceiver configured to broadcast both sets of allocated radio resources in the cellular communications network.

11. The access node of claim 10, wherein the transceiver is further configured to broadcast both sets of allocated radio resources within a downlink configuration indicator.

12. The access node of claim 10, wherein the access node is at least one of the following:
    a base station, an eNodeB.

13. A user equipment comprising:
    a receiver configured to receive a broadcast comprising a set of allocated radio resources for a transmission taking place at a transmission time instance (N) and for a further transmission taking place at a further transmission time instance (N+k), the further transmission relating to a response to the transmission taking place at the transmission time instance (N), wherein the response comprises a feedback message, wherein the feedback message is an ACK or a NACK message, and wherein any data present at the further transmission time instance (N+k) is multiplexed together with data relating to the response to be transmitted at the further transmission time instance (N+k); and
    a transmitter configured to transmit the further data transmission at the further transmission time instance (N+k).

14. The user equipment of claim 13, further comprising:
    a multiplexer configured to multiplex data to be transmitted together with data relating to the feedback message at the further transmission time instance (N+k).

15. The access node of claim 10 in a cellular communications network and at least one user equipment comprising:
    a receiver configured to receive a broadcast comprising a set of allocated radio resources for a transmission taking place at a transmission time instance (N) and for a further transmission taking place at a further transmission time instance (N+k), the further transmission relating to a response to the transmission taking place at the transmission time instance (N), and
    a transmitter configured to transmit the further data transmission at the further transmission time instance (N+k).

16. A computer program product embodied on a non-transitory computer-readable medium in which a computer program is stored that, when being executed by a computer, is configured to provide instructions to control or carry out the method of claim 1.

\* \* \* \* \*